United States Patent Office 3,050,477
Patented Aug. 21, 1962

3,050,477
METHOD OF MAKING POLYURETHANE FOAM USING AN ORGANIC SILANE
George T. Gmitter, Akron, and Emery V. Braidich, Cuyahoga Falls, Ohio, assignors to The General Tire & Rubber Company, Akron, Ohio, a corporation of Ohio
No Drawing. Filed Oct. 13, 1959, Ser. No. 846,052
11 Claims. (Cl. 260—2.5)

This invention relates to polyetherurethane foams and to methods for making the same. More particularly, it relates to stable, flexible, cellular or foamed polyetherurethane compositions or products having at least a substantially uniform cell structure and to methods for making the same.

When manufacturing polyetherurethane foams, it is necessary to have cells of uniform size to obtain uniform properties and a foam which does not collapse prior to forming a strong gel or curing. In many instances, the rates of blowing, due to the isocyanate and water reaction which liberates $CO_2$, and the rates of chain extension and crosslinking, due to the isocyanate/amine (from $H_2O$) reaction including crosslinking with polyol and reactions through active hydrogen atoms on urea and urethane links, are not coordinated. Thus, if the foaming action is too rapid, large irregular cells result, or if the foaming action is completed before the crosslinking reaction has advanced sufficiently to provide a strong product, the foam collapses. Accordingly, it is a primary object of the present invention to avoid the difficulties alluded to above and to provide a method for making a polyetherurethane foam composition or product having cells which are uniform or substantially uniform in size and/or shape and which does not collapse prior to gelling or curing.

It is another object to provide a polyetherurethane foam which is stable, does not collapse and exhibits cells of uniform or substantially uniform size and/or shape.

These and other objects and advantages of the present invention will become more apparent to those skilled in the art from the following detailed description and examples.

According to the present invention, it has been discovered that the addition of a small amount of a particular monomeric organic silane to a polyetherurethane reaction medium will result in foams of uniform or substantially uniform cell structure and which are stable and do not collapse. In many instances the cells are relatively small. It is not precisely known how these silanes function during the foaming, chain extension and crosslinking etc. reactions to produce foams, but it may be that they are acting as wetting agents to maintain the reactants properly dispersed during the joint foaming, chain extension and crosslinking reactions so that these reactions proceed at the proper rates to provide satisfactory results. These monomeric silanes are easy to prepare. Since these silanes are monomeric, they will always be constant in properties and the question of molecular weight distribution and range is not critical.

The organic silane stabilizer used in the practice of the present invention has the formula

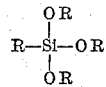

where R is an alkyl group of from 1 to 6 carbon atoms or an alkenyl group of from 2 to 6 carbon atoms. The R radicals do not have to be the same and different radicals can be used on the same molecule. Examples of useful organic silanes are methyl trimethoxy silane, ethyl trimethoxy silane, butyl trimethoxy silane, ethyl triethoxy silane, ethyl tributoxy silane, ethyl trihexyloxy silane, amyl triethoxy silane, hexyl triethoxy silane, isopropyl tributoxy silane, isopropyl trivinyloxy silane, ethyl dimethoxy propoxy silane, vinyl diallyloxy methoxy silane, allyl triallyloxy silane, isobutyl trimethoxy silane, allyl trimethoxy silane, 1-hexenyl tripropoxy silane, 1-butenyl trimethoxy silane, 2-butenyl triethoxy silane, methyl tri-1-pentenyloxy silane, butyl tributoxy silane, methyl triamyloxy silane, and the like and mixtures thereof.

The monomeric organic silanes disclosed above are well known and can be made by a number of methods. For example, vinyl or allyl chloride can be reacted with a copper-silicon alloy at high temperature to obtain vinyl or allyl trichlorosilanes which then can be reacted with an alcohol such as propanol or a mixture of alcohols to obtain a vinyl or allyl tripropoxy silane and the like. Methyl trichloro silane can be reacted with allyl alcohol to give methyl triallyloxy silane etc. Additional methods for making these silanes can be found in "Silicones and Other Organic Silicon Compounds," Post, Reinhold Publishing Corp., New York, N.Y., 1949.

The monomeric organic silanes are used in a minor amount as necessary to obtain cells of uniform or substantially uniform size and to stabilize the foam or keep it from collapsing prior to formation of a good gel or a good cure. Very small amounts are useful. Very large amounts are wasteful and may adversely affect the properties of the foam. The amounts to use will depend on the molecular weight of the silane and the amount and molecular weight of the polyol. In general, it has been found useful to employ a total of from about 0.05 to 3.0% by weight, preferably from about 0.1 to 0.6% by weight, based on the total weight of the polyol(s) present, of the monomeric organic silanes.

In some instances, such as in the manufacture of polyetherurethane foams by the "one-shot" process, it is very desirable to use in addition to the organic silane monomer a diol modifier to improve the foaming action. Where the polyol may contain a large number of secondary hydroxyl groups, the use of the modifier may desirably provide cells of smaller and uniform size. However, the diol modifier is also useful with other polyols such as those containing a predominating amount of or entirely primary hydroxyl radicals and will also tend to reduce cell or pore size. The modifier is used in a total amount of from about 0.1 to 3.0% by weight based on the total weight of polyol(s) present. The modifier should contain only carbon, hydrogen and oxygen, have an average molecular weight of not above about 2000, and have from 2 to 8 carbon atoms between oxygen atoms, and should be capable of absorbing or dissolving water in an amount of at least about 3% by weight. Examples of such materials are ethylene glycol, 1,4-butanediol, 2,3-propylene glycol, diethylene glycol, polyethylene glycol of an average molecular weight of about 400, dipropylene glycol, pentamethylene glycol, 1,6-hexanediol, 1,7-heptanediol, 1,8-octanediol, 1,3-butanediol, 2,3-hexanediol, triethylene glycol, tetraethylene glycol, tripropylene glycol, 2-methyl-2,4-pentane diol, polyethylene glycol (av. M.W.=200), polypropylene glycol (av. M.W.=400), polyethylene glycol 1000 (av. M.W.=1,000), polyethylene glycol 1500 (av. M.W.=1500), polypropylene glycol 750 (av. M.W.=750), "Pluronic L-61," (a polyethylene-propylene ether glycol having a polypropylene oxide nucleus of a molecular weight of about 1500 capped on each end with ethylene oxides to make a polyether glycol having an average molecular weight of about 2000 and having about 13+% ethylene oxide units), and the like and mixtures thereof.

The products of the present invention are cellular or porous and may be flexible, rigid or semi-rigid. The degree of flexibility, rigidity and/or porosity depends on the degree of linearity or branching of the polyether or polyisocyanate and the use of blowing agents.

The polyether polyols (polyalkyleneether glycols) employed in the practice of the present invention may be obtained from alkylene oxides, glycols, heterocyclic ethers and other materials by polymerization, copolymerization and the like. For example, tetrahydrofuran may be polymerized in the presence of catalytic amounts of fluorosulfonic acid to make polytetramethylene ether glycol having the formula

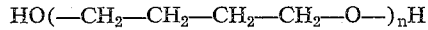
$$HO(-CH_2-CH_2-CH_2-CH_2-O-)_nH$$

where $n$ is an integer. Glycols, also, may be polymerized in the presence of mineral acids, sulfonic acid or fuller's earth. Still other methods well known to those skilled in the art can be utilized in the preparation of these polyalkyleneether glycols. The linear polyalkylene ether glycols have at least three carbon atoms in their alkylene groups and can have as high as 8 or more carbon atoms in their alkylene groups. Useful examples of polyether glycols are polypropylene ether glycol, polyethylenepropylene ether glycol, polytetramethylene ether glycol, polypentamethylene ether glycol, polyhexamethylene ether glycol, poly-1,6-octamethylene ether glycol and the like and mixtures thereof.

Branch chain polyether polyols may be obtained by reacting glycols, alkylene oxides, oxetanes or mixtures thereof and the like with materials such as sucrose, sorbitol, styrenevinyl alcohol copolymers, hexanetriol, pentaerythritol, glycerol, phloroglucinol, trimethylol phenol, trimethylol benzene, trimethylol propane and the like. In making foams which are rigid, it is generally preferred to employ the low molecular weight branched chain polyether polyols, whereas in making flexible materials it is preferred to employ the high molecular weight branched chain polyols.

The average molecular weight of the polyetherpolyols may vary from about 175 to 5000 or more. When making flexible polyetherurethane foams, it is desirable to employ branched chain polyethers having an average molecular weight of from about 2000 to 4000 and at least 2 reactive hydroxyl groups.

In some polyurethane formulations it is not necessary to use crosslinking materials. However, when employed, they may contain from 2 up to 8 or more reactive hydroxyl radicals. Their molecular weight can be low or it can be as high as the polyethers disclosed hereinabove which can be employed and which are highly branched such as a reaction product of glycerol and propylene oxide or hexane triol and propylene oxide and the other polyether polyols mentioned above. Still other materials which can be used as crosslinking polyols are pentaerythritol, glycol, glycerol, trimethylol propane, phenyl trimethylol methane, 1,2,4-butanetriol, 1,1,1-trimethylol hexane, pentaerythritol monoleate, 1,4-butanediol, 1,2,6-hexane triol, N,N,N',N'-tetrakis (2-hydroxypropyl) ethylene diamine, "Hyprose SP-80" (the reaction product of a sucrose with 8 equivalents of propylene oxide to give a compound having 36 carbon atoms and eight reactive hydroxyl groups), and the like, some of which have been disclosed above. Mixtures of these materials, also, are useful.

The polyethers should contain at least 3 carbon atoms between ether linkages to avoid water sensitivity. However, ethylene linkages can be used provided a substantial amount of the other linkages contain 3 or more carbon atoms. While unsaturated polyethers and polyols may be employed, it is much preferred to use materials which are saturated or essentially saturated. The polyethers, also, should be substantially or essentially hydroxyl terminated. It, moreover, is preferred that the OH groups be primary or secondary and it is even more preferred that the OH groups of the polyethers and crosslinkers be primary OH groups to improve heat stability.

Minor amounts of polyesters or polyester polyols may be used with the polyethers so long as the resulting polyurethane or polyurethane mixture contains a major or predominating amount of ether linkages as compared to ester linkages and so that the polyurethane is considered to be a polyether-urethane. The polyesters should be hydroxyl terminated, should have an average molecular weight of from about 600 to 3000 or more, and should have an acid number less than 10 and preferably less than 3. The polyester is normally prepared by the esterification of at least one aliphatic dibasic acid or an anhydride thereof with at least one glycol. Ratios of more than one mole of glycol to acid are used so as to obtain chains containing a preponderance of terminal hydroxyl groups. The acids used in making the polyesters are generally aliphatic dicarboxylic acids having the formula HOOC—R—COOH where R is an alkylene radical having from 2 to 8 carbon atoms. Some examples of dicarboxylic acids are adipic, succinic, pimelic, suberic, azelaic and sebacic acids. The anhydrides of the acids also can be used. Mixtures of acids and their anhydrides may be employed. The glycols used in making the esters generally contain from 4 to 10 carbon atoms. Mixtures of the glycols can be employed and examples of useful glycols are butanediol-1,4, hexamethylenediol-1,6, octamethylenediol-1,8 and the like. The polyesters can also be made by transesterification and other processes. Mixtures of polyesters can be employed. Where branched chain polyesters are desired, they may be obtained by the reaction of polyols such as glycerol, hexanetriol, pentaerythritol and the like with dicarboxylic and other polycarboxylic acids or anhydrides.

The polyester, also, can be made with minor amounts of diamines or amino alcohols to provide the polyester with a small number of amide linkages and a minor amount of amine termination. However, the diamines or amino alcohols should be used in the amount of 25 mole percent or less so that the polyester contains a preponderance of ester linkages, a minor amount of amide linkages and a minor amount of amine termination and is considered to be a polyester.

The glycerides of ricinoleic acid, castor oil, alkyd resins etc. also, can be utilized in minor amounts.

It is preferred that the polyester when used contain a substantial number of carbon linkages of at least 3 carbon atoms between ester linkages, be saturated, and contain primary or secondary OH termination, more preferably primary OH termination. Instead of using mixtures of polyesters and polyethers, these materials or mixtures of dicarboxylic acids and polyetherglycols and the like may be reacted together to form a composite polyether-ester polyol containing a major or predominating amount of ether as compared to ester linkages. Mixtures of the various polyols disclosed herein such as polyethers, polyether-esters, polyethers-polyesters, and polyol crosslinking agents etc. can be used in the practice of the present invention.

If the polyethers, polyesters, and polyols etc. are impure or contain traces of catalysts etc. which would tend to speed their reaction with polyisocyanates where fast reactions are not wanted, they may be washed or otherwise treated to reduce this activity. The polyisocyanates can be recrystallized or distilled to purify them.

The polyisocyanate used in the practice of the present invention may be any polyisocyanate having 2,3, or more functional or reactive isocyanato groups. They can be aromatic (which are preferred), aliphatic or aliphatic-aromatic compounds. Examples of useful polyisocyanates are tolylene diisocyanate, p,p'-diisocyanato diphenylmethane, dimethyl diphenylmethane diisocyanate, bitolylene diisocyanate, bibenzyl diisocyanate, durene diisocyanate (2,3,5,6-tetramethylparaphenylene diisocyanate), diphenyl dimethyl methane diisocyanate, hexamethylene diisocyanate, naphthalene-1,5-diisocyanate, naphthalene triisocyanate, dichlorodiphenyl methane diisocyanate, metaphenylene diisocyanate, paraphenylene diisocyanate, diphenylene ether diisocyanate, and polyaryl polyisocyanates such as "Papi" having the general formula:

where $n$ has an average value of 1. Still other polyisocyanates can be employed. Mixtures of the polyisocyanates can be used; for example, an 80-20 or 65-35 mixture of 2,4- and 2,6-tolylene diisocyanates or other polyisocyanate mixture can be used. A preferred class of diisocyanates to use including the tolyene diisocyanates has the general formula:

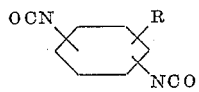

where R is selected from the group consisting of hydrogen, methyl, ethyl, propyl, isopropyl, butyl, amyl, hexyl, and the other lower molecular weight alkyl radicals.

The amounts of polyethers, crosslinker (if used), polyether-polyester mixture and polyisocyanate employed depend on the degree of chain extension and crosslinking desired, as well as on the type of polyol or polyisocyanate used and the ultimate type of product desired and its properties. In general, in the practice of the present invention there can be employed from about 0.5 to 12 equivalents of isocyanate per equivalent of polyether hydroxyl or polyether-polyester (mixed) hydroxyl and from about 0.05 to 5 equivalents of polyol crosslinker hydroxyl per equivalent of polyether hydroxyl or polyether-ester (mixed) hydroxyl. The product of the present invention can contain residual hydroxyl or isocyanato groups or the reactants can be so balanced that the final product contains essentially no unreacted isocyanato and/or hydroxyl groups. In some instances a product containing residual isocyanato groups is obtained to take advantage of post curing when desired. Moreover, prepolymers formed from the reaction of a polyisocyanate and a polyol containing from about 1 to 25%, preferably from about 4 to 16%, by weight of available reactive isocyanato groups based on 100 parts by weight of the prepolymer can be made by reacting the polyisocyanate with the desired amount of polyol and then adding more polyisocyanate until the above percentages are reached. Alternatively, excess polyisocyanate can be reacted with the polyol to provide the desired excess isocyanato groups. These prepolymers can then be reacted with water, tertiary amine and/or organo-metal catalysts, the organic silane etc. to cause foaming and curing.

A small amount of water (about 0.5 to 5.0% by weight based on the weight of polyol present) as a blowing agent can be added to the reaction mixture to make foam. It can be mixed with the other reactants at the same time in a one-step foaming process. The water may first be added to the polyether or polyetherester but can be introduced to the foaming nozzle at the same time as the other ingredients. If a prepolymer is to be made, it is desirable that the reactants be substantially anhydrous to avoid the formation of urea groups so that in this case the water should be added at about the time of foaming. Lithium aluminum hydride can be used with water as a blowing agent. In place of water or water activated materials, other blowing agents can be used such as the liquid fluoro- or chloro-fluoroalkanes (the "Freons"), liquefied hydrocarbon gases, such as methane and ethane, and the like. Mixtures of the liquefied gases can be used. Mixtures of water and the "Freons" may likewise be used. The liquid organic blowing or foaming materials may be used in an amount of from about 2 to 40%, preferably from 9 to 30%, by weight based on the total weight of the polyurethane forming materials.

When water is added to the urethane reaction mixture to effect blowing, it is desirable, but not absolutely necessary, to employ additionally amine catalysts to facilitate reaction between the isocyanato radicals and the water hydrogen. Useful amine catalysts are the tertiary amines, for example, triethyl amine, 4-N amyl pyridine, trihexyl amine, N-methyl morpholine, 4-pyridine propanol, 2-ethanol pyridine, di(ethylene amino ethanol) adipate, dibutyl amino ethanol, N,N'-diethyl-2-methyl piperazine and the like. These amine catalysts are used in an amount sufficient to catalyze the reaction. It is preferred to employ just the amount of amine needed to obtain the desired rate of reaction, to avoid waste of the catalyst, to reduce the possibility of deterioration of the product and to reduce the odor level. Generally, from about 0.05 to 3.0% by weight of the catalyst based on the total weight of the polyol is used although other amounts may be employed.

Other very useful materials to employ as catalysts and which, also, unexpectedly prevent dry heat degradation of the polyetherurethane foam are aromatic tin catalysts such as dibenzyl tin dilaurate. These tin compounds have from 1 to 3 Ar-CH$_2$— groups attached to the tin nucleus where Ar is a phenyl, naphthyl, anthryl or biphenyl radical or its monoalkyl (1-5 carbon atom) ring substituted derivative. The remaining groups attached to the tin through O, S, Se or Te radicals, are ester containing groups or are O, S, Se or Te alone. Examples of these tin catalysts are dibenzyl tin dioleate; dibenzyl tin di-2-ethyl hexoate; tribenzyl tin laurate; benzyl tin tristearate; benzyl tin di-butyrate, caprate; di(naphthyl-alpha-methylene) tin phthalate; di(1-methyl-naphthyl-4-methylene) tin adipate; o-butyl benzyl tin dielaidanate; benzyl, anthryl-alpha-methylene tin glutarate; benzyl, o-phenyl benzyl, m-ethyl benzyl tin stearate; benzyl tin formate, -hexoate, -oleate; the dibenzyl tin ester of 1,2-naphthalene dicarboxylic acid; dibenzyl tin oxide; dibenzyl tin sulfide; di(o-phenyl benzyl) tin selenide; di-(naphthyl-alphamethylene) tin telluride; di-benzyl tin sulfide trimer; dibenzyl tin di-mercapto ethanol lauric acid ester; dibenzyl tin di-mercapto butanol trimethyl-hexanoic acid ester; tri benzyl tin mercapto butanol 2-ethyl hexoic acid ester; dibenzyl tin-acetate, mercapto ethanol lauric acid ester; and the like and mixtures thereof.

The above tin compounds can readily be prepared by reacting an aromatic tin halide with the alkali salt of the desired acid. For example, tribenzyl tin chloride (10) is reacted in hot benzene (2) with the calculated amount of sodium acetate, filtered while hot, and permitted to stand to form the product, tribenzyl tin acetate having a M.P. of 117–118° C. (from C$_6$H$_6$). The lauryl, stearyl and other ester derivatives may be similarly prepared (Chem. Abstracts, 1956, 7856g). Dibenzyl tin maleate is prepared in similar fashion from dibenzyl tin dichloride and the disodium salt of maleic acid. Dibenzyl tin oxide is obtained by hydrolyzing dibenzyl tin dichloride with NH$_4$OH or KOH. Dibenzyl tin sulfide is obtained by reacting benzyl chloride in dry ether with stannic chloride and magnesium; the resulting tribenzyl tin chloride is then reacted with hydrogen sulfide in anhydrous benzene to give dibenzyl tin sulfide,

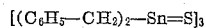

a trimer and benzyl chloride. Also, for example, dibenzyl tin di-mercapto-ethanol trimethyl hexanoic acid ester is prepared by adding to a reflux condenser one mole of mercapto ethanol, one mole of trimethyl hexanoic acid and 200 ml. of benzene (to which 0.3 gram of p-toluene sulphonic acid is added). The ingredients are refluxed until 18 ml. of water has been eliminated by azeotropic distillation. 0.5 mole of dibenzyl tin oxide is added and refluxing is continued until the theoretical amount of water is distilled off. Slight impurities are drawn off and the excess benzene distilled. The residue obtained is a very viscous liquid which is slightly yellow in color and soluble in ether, chloroform, and toluene. Analysis for tin and sulfur gave:

|  | Sn | S |
|---|---|---|
| Calculated | 16.1 | 8.7 |
| Found | 16.0 | 8.8 |

These and other similar methods well known to those skilled in the art can be used to prepare these catalysts.

Other additives may be added to the reaction mixture of the present invention such as emulsifiers which are preferably anionic or nonionic and also preferably are nonacidic or substantially nonacidic. Other wetting agents, carbon black, $TiO_2$, $SiO_2$ containing materials, wood flour, metal flakes, organic and inorganic synthetic and natural fibers (wool, cellulose, nylon, glass etc. (surface treated or not)), color pigments, dyes, antioxidants, antiozonants or antidegradants, deodorants, fungicides, plasticizers, rubbers, resins, fire retardants and so forth, also, are useful additives in the reaction mixture. Dibutyl tin dilaurate and similar tin compounds can be used, but they are not as effective as the dibenzyl tin compounds previously described. If a foam is to be made using water, the water can be added in the form of a natural or synthetic rubber and/or resin latex.

Examples of antioxidants, antiozonants and/or antidegradants which can be used in minor amounts are alkyl substituted phenols, N,N'-dialkyl substituted phenylene diamines, alkyl and aryl phosphites and the like as well as halogenated organic phosphites, such as halogenated aryl, alkyl, alkaryl, aralkyl and cycloaliphatic phosphites and the like and mixtures thereof.

The halogenated organic phosphites are well known and can be made by a number of methods. For example, one method for preparing them is to react a chloroalkanol, such as 3-chloro propanol-1, with phosphorous trichloride. The reaction product contains alkyl chloride and the trichloro alkyl phosphite which can readily be separated from the alkyl chloride. Another method is to react a phenol with phosphorous trichloride to obtain phenyl chloride and tri(chloro phenyl) phosphite which can be separated from the phenyl chloride.

In making the products of the present invention the polyisocyanate may be reacted with the polyether or polyether-polyester mix etc. and then a crosslinker as desired to form a finished product. However, the polyisocyanate can first be reacted with the crosslinker and then with the polyether. A prepolymer of a polyether and polyisocyanate may be formed. Also, it is not necessary always to use a crosslinker but by proper selection of the polyether employed it will only be necessary to react the polyisocyanate with the polyether or polyether-polyester mixture etc. to obtain the desired products. The use of the organic silane monomer of this invention is particularly effective in a "one-shot" process where all of the ingredients are pumped (and heated as necessary) to the nozzle of a foaming machine to be intimately mixed together and then delivered or dumped into pans or forms wherein the reaction mixture is allowed to foam and cure. Heat is applied as necessary to insure the proper reaction, chain extension, crosslinking, cell formation and vaporization or decomposition of the blowing agent. After curing, the foam can be either heated or aged as desired to improve its properties. Such aging may be conducted in a moist atmosphere. Furthermore, flexible foams can be squeezed or wrung during or after curing to break the cell walls to increase their moisture vapor transmission and their resilience in some instances. If heated, during the squeezing operation, some of the catalyst or catalyst products or residues may be evolved if vaporizable and not trapped within the polyurethane itself.

The products of the present invention are useful in making rubbery, resilient, flexible, semi-rigid, rigid, cellular (open or closed cell) polyetherurethanes and the like. Some specific examples of useful articles which can be made from the products of the present invention are bumpers, carpet underlays, pillows, insulated boots, mattresses, cushioning for furniture, and door panels; insulation for food containers, refrigerators, and inaccessible pipe clusters; sandwich construction for panels, walls of buildings, vehicles, and the like; buoyant elements for boats, buoys, life rafts and life preservers; and lightweight reinforcing material for aircraft etc.

The following examples will serve to illustrate the invention with more particularity to those skilled in the art:

*Example I*

A prepolymer was made by reacting two moles of an 80/20 mixture of 2,4- and 2,6-tolylene diisocyanates with one mole of polypropylene ether glycol (PPG 2000–M.W. 2000) and then adjusting the final isocyanate content with an additional amount of the 80/20 2,4-/2,6-tolylene diisocyanate mixture to obtain an NCO value (available reactive isocyanato groups) of 9.5% by weight of the prepolymer. 75 parts of the prepolymer, 0.31 part of amyl triethoxy silane, 1.0 part of N-methyl morpholine, 0.3 part of triethyl amine and 1.7 parts of water (all parts being by weight) were then mixed together and poured into a mold to foam and cure. The material foamed and cured without collapsing or giving visible evidence of shrinkage. It had a fine uniform cell structure in which the cells were small and of the same general shape. The resulting flexible foamed product then was crushed or squeezed by passing between rollers to produce essentially a 100% open cell structure and was tested. The results of the tests showed that the foam had a density of 2.5 lbs./cu. ft., a Schopper rebound of 52%, a tensile strength of 15.4 p.s.i., a tear strength of 4.4 lbs. per in., an ultimate elongation of 333% and a set (after 50% deflection) of 10.9%.

*Example II*

The method of this example was the same as Example I, above, except that 1.1 parts of amyl triethoxy silane and 1.67 parts of water were used instead of the amounts shown in Example I. The mixture foamed and cured without collapsing or shrinking appreciably and the foamed product before and after squeezing exhibited a uniform fine cell structure. Tests on the sponge gave the following results: density, 2.8 lbs./cu. ft.; Schopper rebound, 45%; tensile strength, 14.2 p.s.i.; tear, 4.6 lbs./in.; ultimate elongation, 267%; and set (after 50% deflection), 18.8%.

*Example III*

The method of this example was the same as Example I, above, except that in making the prepolymer the starting molar ratio of the toluene diisocyanate mixture to the polypropylene glycol was 4:1 and 0.44 part of vinyl triethoxy silane was used in place of the amyl triethoxy silane. The mixture also foamed and cured without shrinking or collapsing and the foamed product before and after squeezing exhibited a uniform cellular structure of many small cells of essentially the same size. Physical tests gave the following results: density, 2.4 lbs./cu. ft.; Schopper rebound, 51%; tensile strength, 20.4 p.s.i.; tear, 4.9 lbs./in.; ultimate elongation, 357%; and set (after 50% deflection), 8.9%.

*Example IV*

The method of this example was the same as Example I, above, except that the prepolymer was prepared by reacting 1 mole of Dow "Polyol 112–3," instead of polypropylene glycol, with 3 moles of the 80/20 tolylene diisocyanate mixture followed by adjustment with the 80/20 tolylene diisocyanate mixture to an NCO value of 9.5% and the use of only 0.05 part of amyl triethoxy silane.

The resulting foam did not collapse and had a very fine uniform cell network. After squeezing the foam, it was tested and exhibited the following properties: density, 2.3 lbs./cu. ft.; Schopper rebound, 57%; tensile strength, 16.4 p.s.i.; tear, 2.9 lbs./in.; and ultimate elongation, 167%. Dow "Polyol 112-3" is a polypropylene oxide adduct of glycerol which is capped with ethylene oxide to provide a predominant amount of primary end groups, has an average molecular weight of about 2800.

*Example V*

75 parts of Dow "Polyol 112-3," 0.75 part of "Polygard," 2.25 parts of Armour "DM16D," 1.8 parts of amyltriethoxy silane, 22.5 parts of an 80/20 mixture of 2,4- and 2,6-tolylene diisocyanates and 1.9 parts of water (all parts being by weight) were introduced into the nozzle of a foaming machine where the ingredients were thoroughly mixed and the mixture was then dumped into a pan. The mixture readily foamed, gelled and cured without collapsing and the resulting foamed product exhibited a fine uniform cell network. The foam was then squeezed and tested. It exhibited a density of 2.8 lbs./cu. ft. and a Schopper rebound of 47%. "Polygard" is a trinonyl aryl phosphite. Armour "DM16D" is a dimethyl alkyl amine in which the alkyl group is mainly a 16 carbon atom alkyl group and is obtained from a fatty acid.

*Example VI*

The method of this example was the same as that of Example V, above, except that the "Polygard" was omitted, only 1.5 parts of amyltriethoxy silane was used and 0.5 part of 1,4-butanediol was added. The mixture readily foamed, gelled and cured without collapsing. The cells of the foam were also uniform but of a somewhat smaller size than those in Example V, above. After squeezing, the foam was tested and exhibited a density of 2.6 lbs./cu. ft, a Schopper rebound of 48%, a tensile strength of 17.5 p.s.i., and a 50% set of 11.1%.

*Example VII*

The method of this example was the same as that of Example V, above, except that the "Polygard" and Armour "DM16D" were omitted; the water was increased to 2.2 parts and the 80/20 tolylene diisocyanate mixture was increased to 28.0 parts; and 0.5 part of 2,3-propylene glycol, 0.5 part of N-methyl morpholine and 0.15 part of dibutyl tin dilaurate were added. The mixture readily foamed and gelled without collapsing and the foam exhibited a fine uniform cell structure in which the cells were smaller in size than those of Example V, above. After squeezing the cured foam, it was tested and exhibited a density of 2.14 lbs./cu. ft. and a Schopper rebound of 44%.

*Example VIII*

75 parts of "Niax Triol LG-56," 0.75 part of "Polygard," 2.25 parts of "DM16D," 1.8 parts of amyltriethoxy silane, 22.5 parts of an 80/20 mixture of 2,4- and 2,6-tolylene diisocyanates and 1.9 parts of water (all parts being by weight) were introduced into the nozzle of a foam machine where the ingredients were thoroughly mixed and pumped into a mold to foam. The resulting mixture readily foamed, gelled and cured without collapsing and the resulting foamed product exhibited a somewhat generally irregular (large and small cells) cell structure. The physical properties of the foam were somewhat similar to those of Example V, above. However, when the same procedure was followed except that 1.8 parts of ethylene glycol were added to the reaction mixture, the foam obtained exhibited a fine and a uniform cell structure. This example illustrates that with some polyols having a large number of secondary hydroxyl radicals it is important to employ additional hydroxyl furnishing material such as the modifiers mentioned above to obtain relatively smaller and more uniform pores throughout the sponge. "Niax Triol LG-56" is a propylene oxide adduct of glycerol containing substantially 90–95% secondary OH radicals, an OH number of about 56 and an average molecular weight of from about 2800 to 3100.

*Example IX*

The method of this example was the same as that of Example I, above, except that the amyl triethoxy silane was omitted. At the conclusion of foam rise, the foam remained stable for only a few minutes and then followed. The cells of the resulting very high density foam were examined and were found to be irregular (many voids, large cells and small cells). This example shows the necessity for using the silane to obtain stability in foaming.

*Example X*

The method of this example was the same as that of Example I, above except that

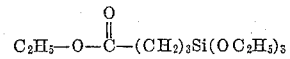

$$C_2H_5-O-\overset{O}{\underset{\|}{C}}-(CH_2)_3Si(OC_2H_5)_3$$

and $H_2N-(CH_2)_3Si(OC_2H_5)_3$, respectively, were used in place of amyl triethoxy silane. In each case the foam collapsed and the cells of the foam were irregular. This result shows that where R, attached directly to Si in the foregoing formula, is other than an alkyl or alkenyl group, unsatisfactory results are obtained.

*Example XI*

The method of this example was the same as Example I, above, except that heptyl triheptoxy silane, heptyl triethoxy silane and dibutyl diethoxy silane were each used in place of the amyl triethoxy silane. In each instance while the foams tended to collapse only slightly, many voids and cells of irregular size were found in the foam. This example shows that if the R groups in the indicated formula contain more than 6 carbon atoms, or if there are less than three alkoxy or alkenyloxy groups, undesirable results will be obtained.

It is to be understood that in accordance with the provisions of the patent statutes, the particular form of composition or product shown and described and the particular procedures set forth are presented for purposes of explanation and illustration and that various modifications of said composition or product and procedure can be made without departing from this invention.

Having thus described the invention, what is claimed is:

1. The method which comprises reacting (1) at least one organic polyisocyanate with (2) at least one polyether polyol containing at least two active alcoholic hydroxyl radicals in amounts sufficient to form a polyurethane in admixture with (3) a minor amount by weight of a foaming agent sufficient to foam the reaction mass of said polyisocyanate and said polyol and in contact with (4) a minor amount by weight, based on the total weight of polyol present and sufficient to stabilize the foaming reaction of said polyisocyanate and said polyol and to obtain cells of substantially uniform size in the resulting polyetherurethane, of at least one organic silane having the formula

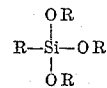

$$R-\underset{\underset{OR}{|}}{\overset{\overset{OR}{|}}{Si}}-OR$$

where R is selected from the group consisting of an alkyl radical of from 1 to 6 carbon atoms and an alkenyl radical of from 2 to 6 carbon atoms and mixtures thereof.

2. The method according to claim 1 in which said polyol is a branched chain polyalkyleneether polyol having at least 3 reactive alcoholic hydroxyl groups and an average molecular weight of from about 2,000 to 4,000, said organic silane is present in an amount of from about 0.05 to 3.0% by weight based on the weight of said polyalkyleneether polyol, said polyisocyanate is an aromatic diisocyanate, and said foaming agent is water.

3. The method according to claim 2 in which the reaction of said polyisocyanate and said polyol is conducted additionally in contact with a catalyst in an amount of from about 0.05 to 3.0% by weight based on the weight of said polyol.

4. The method according to claim 3 in which said organic silane is amyl triethoxy silane.

5. The method according to claim 3 in which said organic silane is vinyl triethoxysilane.

6. The method according to claim 1 in which the reaction of said polyisocyanate and said polyol is conducted additionally with at least one aliphatic diol having an average molecular weight not above about 2000, having from 2 to 8 carbon atoms between oxygen atoms, being capable of dissolving water in an amount of at least about 3% by weight, and consisting of carbon, hydrogen and oxygen and in an amount of from about 0.1 to 3.0% by weight based on the weight of said polyol.

7. The method according to claim 6 in which said polyol is a branched chain polyalkylene ether polyol having at least 3 reactive alcoholic hydroxyl groups, having a predominant amount of the hydroxyl groups as secondary hydroxyl groups, and having an average molecular weight of from about 2000 to 4000.

8. In the method of making a foamed polyetherurethane wherein (1) at least one organic polyisocyanate is reacted with (2) at least one polyol selected from the group consisting of a polyether polyol, a mixture of a major amount of a polyether polyol and a minor amount of a polyester polyol, and a polyesterether-polyol containing a major amount of ether linkages as compared to ester linkages and containing at least two reactive hydroxyl radicals in amounts sufficient to form a polyetherurethane, said polyester being the reaction product of a polyol and a polycarboxylic acid, in admixture with (3) a minor amount by weight of a foaming agent sufficient to foam the reaction mass of said polyisocyanate and said polyol, the improvement comprising conducting said reaction in intimate mixture with (4) from about 0.05 to 3.0% by weight based on the total weight of polyol present of at least one organic silane having the formula

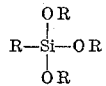

where R is selected from the group consisting of an alkyl radical of from 1 to 6 carbon atoms and an alkenyl radical of from 2 to 6 carbon atoms and mixtures thereof, the hydroxyl groups of each of said polyols being alcoholic hydroxyl groups.

9. The method which comprises reacting (A) a polyetherurethane prepolymer obtained by reacting (1) at least one aromatic diisocyanate with (2) at least one polyol selected from the group consisting of a polyether polyol, a mixture of a major amount of a polyether polyol and a minor amount of a polyester polyol, and a polyether-ester polyol having a major amount of ether linkages as compared to ester linkages and containing at least two active hydroxyl radicals in amounts sufficient to form a polyetherurethane having from about 1 to 25% available reactive isocyanato groups, said polyester being the reaction product of a polyol and a polycarboxylic acid, (B) a catalyst, and (C) water, in admixture with (D) from about 0.05 to 3% by weight based on the weight of said polyol of at least one organic silane, having the formula

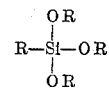

where R is selected from the group consisting of an alkyl radical of from 1 to 6 carbon atoms and an alkenyl radical of from 2 to 6 carbon atoms and mixtures thereof, the hydroxyl groups of each of said polyols being alcoholic hydroxyl groups.

10. The method according to claim 3 in which said organic silane is methyl tripropoxy silane.

11. The method according to claim 3 in which said organic silane is allyl tributoxy silane.

References Cited in the file of this patent

UNITED STATES PATENTS

| | | |
|---|---|---|
| 2,850,464 | Mitchell | Sept. 2, 1958 |
| 2,866,774 | Price | Dec. 30, 1958 |
| 2,888,411 | Pace | May 26, 1959 |
| 2,901,445 | Harris | Aug. 25, 1959 |